June 8, 1954  C. GERST  2,680,377
TRUCK MIXER DRIVE ARRANGEMENT
Filed March 1, 1951  3 Sheets-Sheet 1

INVENTOR.
CHRIS GERST
BY
*Gustav A. Horff*
ATT.

INVENTOR.
CHRIS GERST

June 8, 1954

C. GERST 2,680,377

TRUCK MIXER DRIVE ARRANGEMENT

Filed March 1, 1951

INVENTOR.
CHRIS GERST
BY
*Gustav A. Wolff*
ATT.

Patented June 8, 1954

2,680,377

UNITED STATES PATENT OFFICE

2,680,377

TRUCK MIXER DRIVE ARRANGEMENT

Chris Gerst, Detroit, Mich., assignor, by mesne assignments, to Le Roi Company, Milwaukee, Wis., a corporation of Delaware Application March 1, 1951, Serial No. 213,370

4 Claims. (Cl. 74—15.84)

This invention relates in general to drive mechanism for concrete mixers, and, more particularly, to drive mechanism for truck mixers, both the horizontal drum type and the inclined, high dump drum type, in which the truck motor furnishes the power necessary for driving the vehicle and rotating the mixing drum either individually or jointly for mixing concrete-forming materials during transit or other operational use of the truck mixer.

Truck mixers of this type generally include special transmissions with power take-off means, or special power take-off devices coupled with the main drive shaft of the truck. All these arrangements are expensive in material and labor and often necessitate over-sized truck engines to furnish sufficient power for starting driving and mixing operations of such truck mixers, as in gear shift operations of thus constructed truck mixers the released friction clutch means, normally coupling the truck engine and the truck drive transmission with each other, disconnect the drive connection of such engine with the mixing drum. Such disconnection generally effects stopping of the rotation of the mixing drum by shifting operations so that the mixing drum must be restarted by application of substantial power after each gear shift operation.

Arrangements of this type, furthermore, effect rotation of the mixing drum of a truck mixer in proportion to the different gear ratios of the truck drive transmission which results for the low speed gear ratio drive of the truck drive transmission in a too slow rotation of the mixing drum and for the high speed gear ratio drive of the truck drive transmission too fast rotation of such mixing drum, a condition changeable only by rotary drive transmission with several gear ratios.

Deficiencies of this type have been partly overcome by providing truck mixers with independent, additional power plants directly mounted on the chassis of the truck and used only for rotating the mixing drums. Such arrangements, outside of being costly in material and labor, decrease the pay load ratio of a truck mixer as mounting of additional power plant means reduces the space available for the pay-load carrying mixing drum.

The primary object of the present invention is the provision of a transmission mechanism for truck mixers constructed to effect—by the engine of the truck in a simple and economic manner and independent of or in cooperation with the driving mechanism of the truck—individual and joint propelling of the truck and rotation of its mixing drum.

Another object of the invention is the provision of a transmission mechanism for truck mixers constructed to effect by the engine of the truck, independent of or in combination with the driving mechanism of the truck, its propelling and rotation of its mixing drum, the mechanism including, clutch controlled, reduction transmission means arranged between engine and truck transmission and directly coupling same with each other for individually propelling the truck by its engine.

A further object of the invention is the provision of a transmission mechanism for truck mixers constructed to effect by the engine of the truck mixer, independent of or in combination with the driving mechanism of the truck, its controlled propelling and controlled rotation of its mixing drum, the mechanism including clutch controlled reduction transmission means having a main shaft coupled by clutch means directly with the engine and by other clutch means directly with the driving transmission of the truck.

In addition the invention has other marked superiorities which clearly distinguish it from presently known structures. These improvements or superiorities, embodying certain novel features of construction are clearly set forth in the following specification and the appended claims; and a preferred form of embodiment of the invention is hereinafter shown with reference to the accompanying drawings forming part of the specification.

Figure 1:
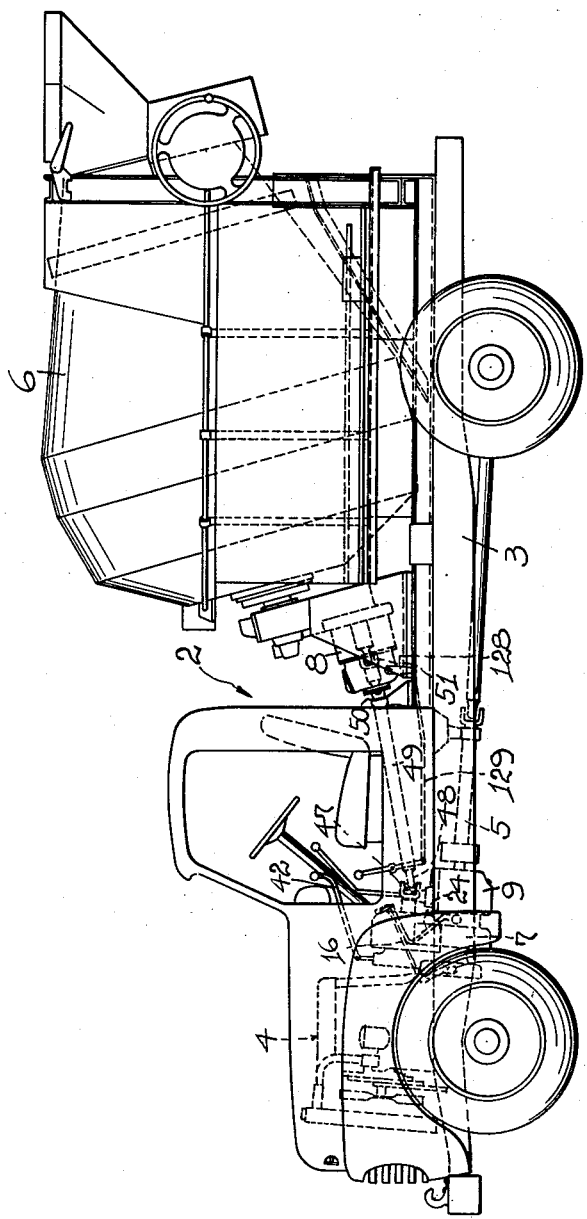
Fig. 1 is a side view of a truck mixer having its engine, in accordance with the invention, coupled with transmission mechanism and a truck drive transmission to effect selective individual or joint propelling of the truck and controlled rotation of its mixing drum.
Figure 2:
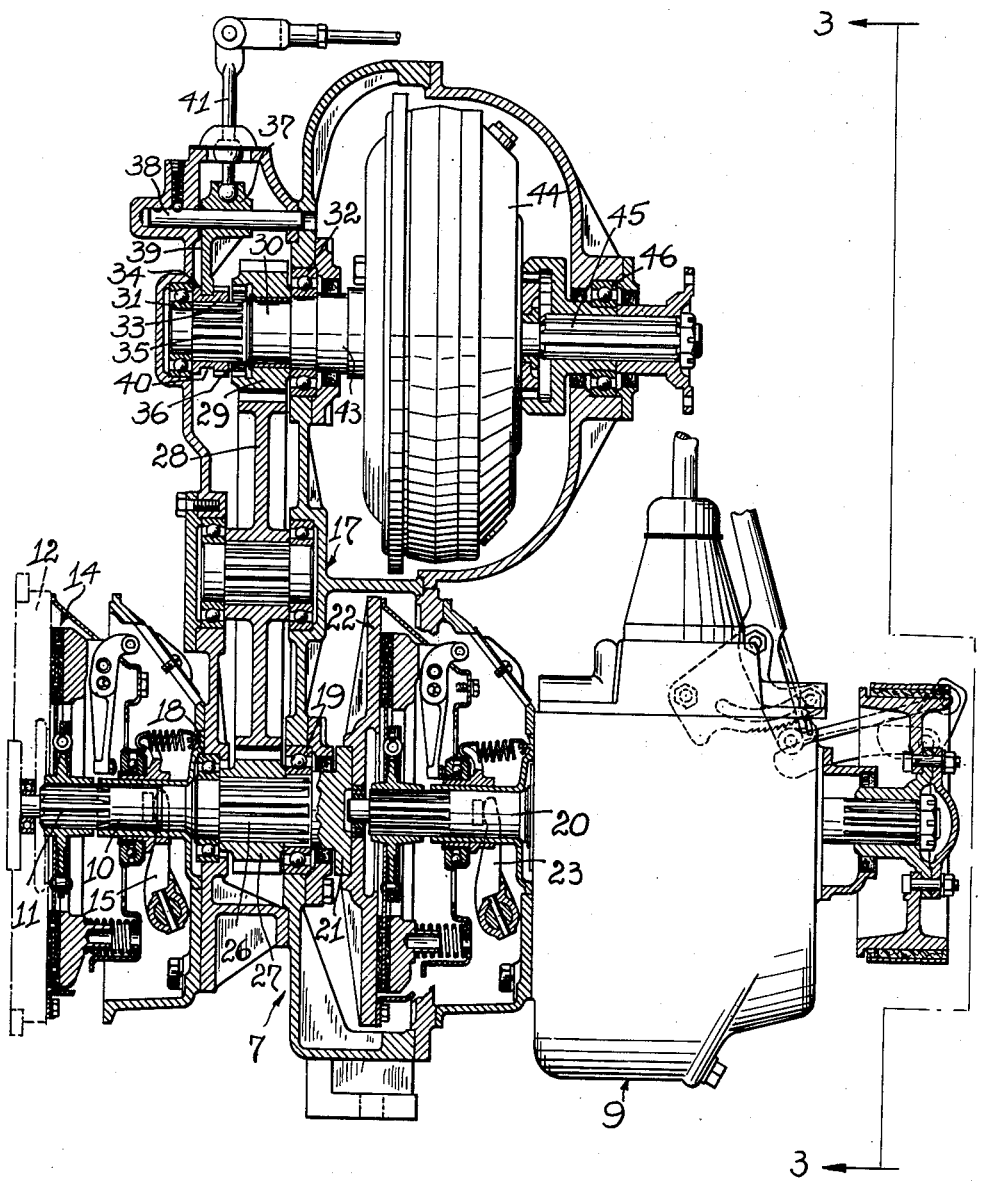
Fig. 2 is a transverse, sectional view partly in elevation through the primary transmission of a transmission mechanism of the type of truck mixer shown in Fig. 1, and furthermore disclosing positioning of the primary transmission between the engine and the driving transmission of a truck mixer.
Figure 3:
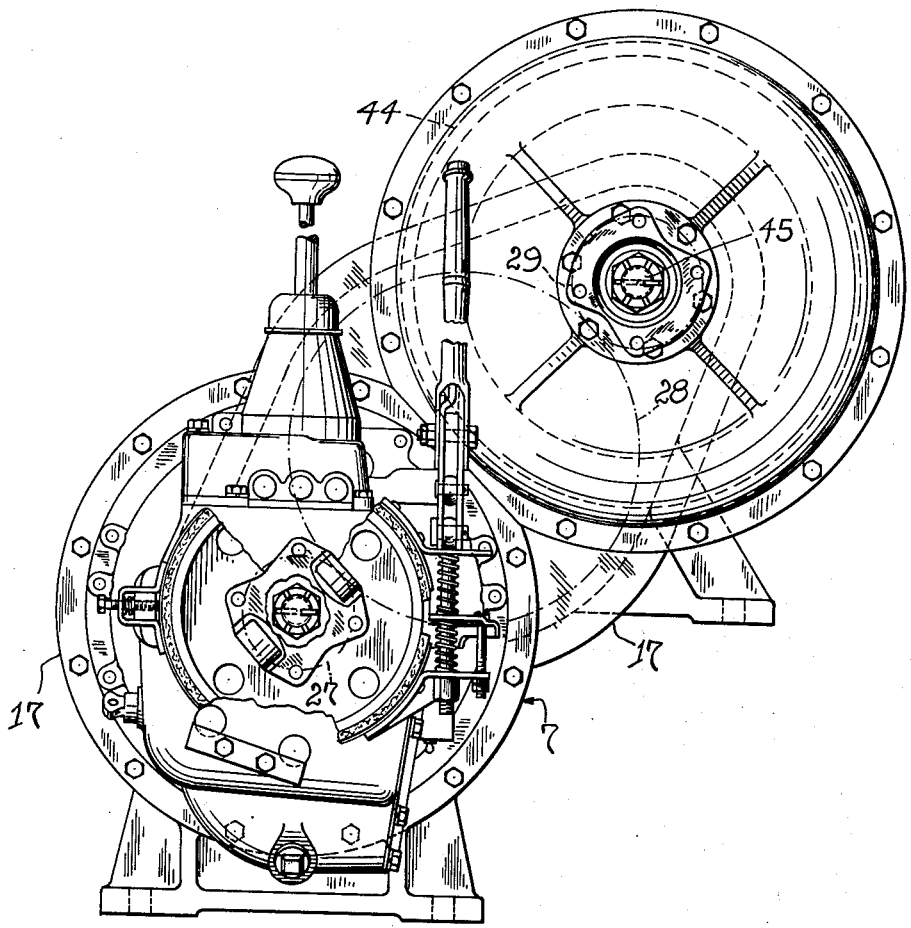
Fig. 3 is an end view of Fig. 2, the view being taken from line 3—3 of said figure.

Referring now more particularly to the exemplified form of the invention shown in the drawings, the truck mixer 2 disclosed in Fig. 1 includes a chassis 3 mounting an engine 4, a main drive shaft 5, and a rotatable mixing drum 6 which is of the inclined, high dump drum type. Engine 4 of the truck mixer effects driving of the main drive shaft 5 and mixing drum 6 by means of a transmission mechanism composed of a primary transmission 7, a secondary transmission 8, and the customary truck driving transmission 9 directly coupled in the usual manner with main drive shaft 5.

In the transmission mechanism, primary transmission 7—a clutch controlled reduction transmission—has its drive shaft 10 at its one end 11 directly coupled with the fly wheel 12 of engine 4 by means of a releasable, spring-loaded friction clutch 14 actuated upon by a fork-shaped shifting lever 15 and a foot pedal 16 operating same. The drive shaft 10 which is mounted in a housing 17 by ball bearings 18 and 19 is axially aligned with the input shaft 20 of the truck driving transmission 9 and has the other end 21 coupled with said input shaft by a releasable spring-loaded friction clutch 22 actuated upon by a fork-shaped shifting lever 23 and a foot pedal 24 operating same. The middle portion of drive shaft 10 is splined at 26 and mounts a pinion 27 coupled by a large idler gear 28 with a pinion 29 freely rotatably mounted on a shaft 30 mounted in housing 17 in ball bearings 31 and 32. Pinion 29 may readily be coupled with shaft 30 by a shiftable toothed clutch sleeve member 33 of a clutch device 34 when said clutch sleeve, slidably and non-rotatably mounted on splined end portion 35 of shaft 30, is shifted toward pinion 29 for coupling engagement with an internally toothed recess 36 in said pinion. Such shifting of clutch sleeve member 33 is effected by a shifting member 37 mounted on a horizontally arranged shiftable rod 38 and engaged with a fork-shaped extension 39 of member 37 with a circumferential groove 40 in clutch sleeve member 33. Shifting member 37 is coupled with a vertical shifting lever 41 connected to a control lever 42 which effects actuation and release of clutch device 34.

The shaft 30 mounts on its free end portion 43 a torque converter or fluid coupling 44, the output shaft 45 of which is mounted in ball bearings 46 and coupled by a universal joint 47 with the one end 48 of a tubular shaft 49, the other end 50 of which is coupled by a universal joint 51 with the outer end of input shaft 52 of secondary transmission 8.

In operation of a truck mixer having transmission mechanism constructed to include a primary reduction transmission 7 arranged to releasably directly couple the standard driving transmission 9 of the truck with its engine 4 and a secondary reversing transmission 8 driven by primary transmission 7 and supporting and driving mixing drum 6, driving of the truck mixer is, directly and independently of rotation of mixing drum 6, effected and controlled by standard driving transmission 9 coupled by friction clutch 14, drive shaft 10 and friction clutch 22 directly with fly wheel 12 of engine 4. Forward and reverse rotation of mixing drum 6 at certain speeds is effected independent of standard driving transmission 9 by the primary transmission 7 in which drive shaft 10 by pinion 27, gear 28 and pinion 29 transfers its rotation to shaft 30 and then through torque converter 14, output shaft 45, tubular shaft 49 and secondary transmission 8 coupled with the end wall of mixing drum 6.

Having thus described my invention, what I claim is:

1. In a drive arrangement, a prime mover, a drive transmission with an input shaft axially aligned with said prime mover and arranged in spaced relation with respect thereto, a driven shaft arranged parallel to said input shaft, and a transmission coupling the prime mover with said input shaft and said driven shaft, said transmission including a main shaft arranged between said prime mover and said input shaft in axial alignment therewith, clutch means at opposite ends of said main shaft adapted to couple same with the prime mover and said input shaft of the drive transmission, and gearing coupling said main shaft with said driven shaft, said gearing including a drive gear rigidly mounted on said main shaft to effect a gear drive connection between said main shaft and said driven shaft.

2. A drive arrangement as described in claim 1, wherein said transmission is enclosed in a housing having the main shaft journaled in walls thereof and extended outside of the housing at the end extending toward the prime mover, and wherein the housing rotatably supports the driven shaft and the gearing coupling same with the main shaft.

3. A drive arrangement as described in claim 1, wherein the gearing coupling the main shaft with the driven shaft includes a driven gear supported by the driven shaft and releasably coupled therewith to permit selective control of the rotation of such driven shaft.

4. In a drive arrangement, a prime mover, a driven shaft axially aligned with said prime mover and arranged in spaced relation with respect thereto, a second driven shaft arranged parallel to said first driven shaft, and a transmission coupling the prime mover with the two driven shafts, said transmission including a main shaft arranged between the prime mover and the first driven shaft in axial alignment therewith, shiftable clutch means at opposite ends of said main shaft adapted to selectively couple its opposite ends with the prime mover and the first driven shaft, and gearing coupling said main shaft with said second driven shaft, said clutch means being cooperable with said main shaft to releasably couple the prime mover with the first driven shaft by a direct drive connection and to releasably couple the prime mover with the second driven shaft.

References Cited in the file of this patent

UNITED STATES PATENTS

| Number | Name | Date |
| --- | --- | --- |
| 1,363,304 | Bickel | Dec. 28, 1920 |
| 1,772,247 | Forrester et al. | Aug. 5, 1930 |
| 2,013,359 | Paris | Sept. 3, 1935 |
| 2,253,148 | Tangen | Aug. 19, 1941 |
| 2,264,031 | Ware et al. | Nov. 25, 1941 |
| 2,397,324 | Muckley | Mar. 26, 1946 |
| 2,399,795 | Everett | May 7, 1946 |
| 2,493,592 | Peabody | Jan. 3, 1950 |
| 2,511,240 | Bohmer et al. | June 13, 1950 |